June 17, 1930.   E. F. HATHAWAY   1,765,268
VARIABLE SPEED TRANSMISSION DEVICE
Filed Jan. 11, 1928
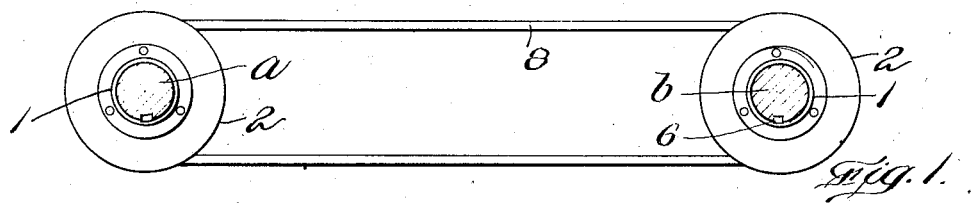
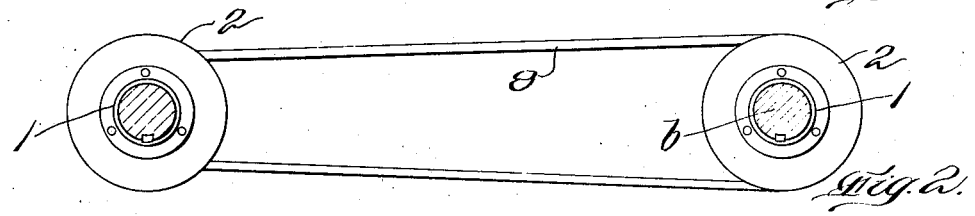
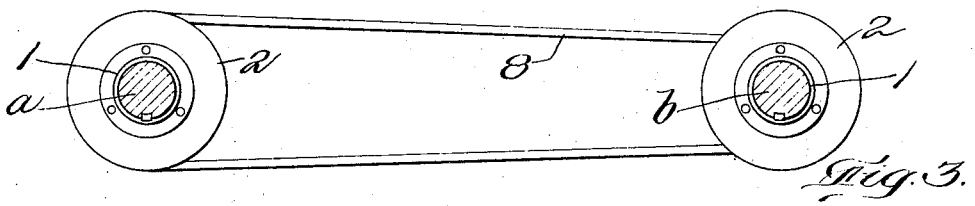
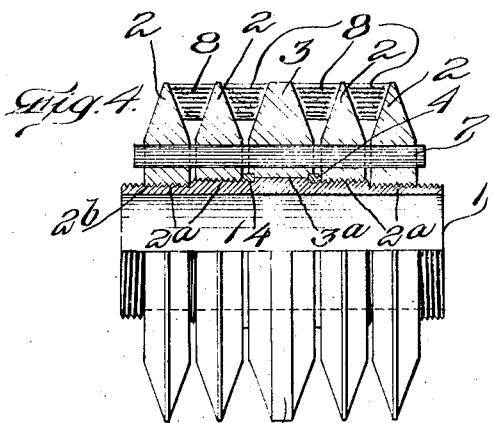
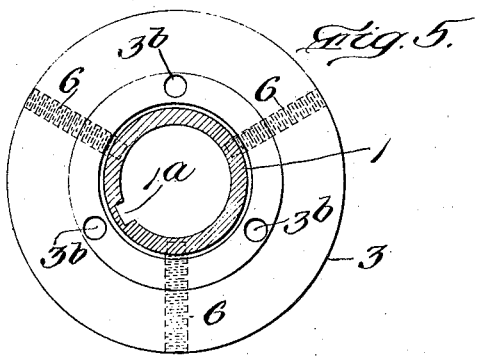
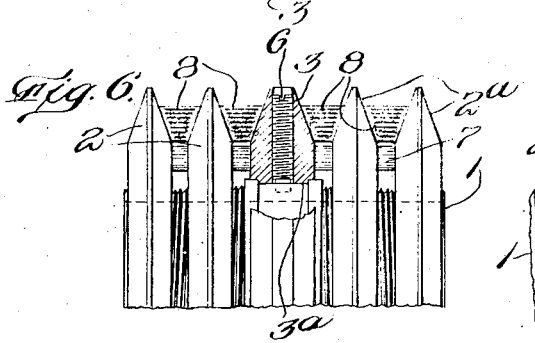
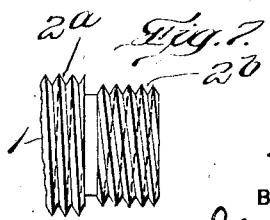
INVENTOR
E. F. Hathaway
BY
Geo. N. Goddard
ATTORNEY Patented June 17, 1930

1,765,268

UNITED STATES PATENT OFFICE

EDGAR F. HATHAWAY, OF WELLESLEY, MASSACHUSETTS, ASSIGNOR TO SHAWMUT ENGINEERING COMPANY, OF BOSTON, MASSACHUSETTS, A CORPORATION OF MASSACHUSETTS

VARIABLE-SPEED-TRANSMISSION DEVICE

Application filed January 11, 1928. Serial No. 245,881.

This invention relates to variable speed transmission devices and is intended to provide a compact device of this kind which, within a small compass, shall possess the capacity for relatively large transmission of power while minimizing belt slip and making simple but reliable provision for varying the speed ratios of the driving and driven elements respectively.

Generally speaking, the invention comprises a pair of belt connected elements embracing a plurality of tapered sheaves or pulley members adapted to receive correspondingly tapered belts between their opposed convergent faces, the individual sheaves being adjustable nearer to or farther from each other to vary the radial distance of the interposed connecting belt so that, as the radial distance of belt engagement of one is increased, the other may be correspondingly decreased, thereby giving a large number of available speed ratios between the limits of variation of the particular mechanism employed.

These and other features of the invention will be described in the following specification and will be defined in the claims hereto annexed.

In the accompanying drawings Fig. 1 is a side elevation of the device when set up or adjusted for transmission of an equal speed or rotation between the driving and the driven shafts respectively.

Fig. 2 is a similar view showing an adjustment for driving the driven shaft at a considerably higher speed than that of the driving shaft.

Fig. 3 is a similar view showing the belt adjustment for low speed transmission.

Fig. 4 is a transverse elevation, the upper half in cross section, of one of the speed change elements showing the transmission belts near their outermost limit.

Fig. 5 is an end elevation of the construction shown in Fig. 4.

Fig. 6 is a front elevation, partly in section, showing the adjustment bringing the belts nearer to the axis of rotation.

Fig. 7 is a detail view illustrating the relative pitch of the threads of two adjacent sheaves or pulley members.

In the practice of this invention, according to the specific form illustrated in the drawings, I provide a hollow shaft or sleeve 1 adapted to be secured to a shaft of appropriate size in any desired manner, as by means of a keyway $1^a$ for the insertion of a key 6.

For present purposes, it will be assumed that the shaft $a$ is the driving shaft and that the shaft $b$ is the driven shaft, although of course either shaft might be the power or driving shaft and the other the driven shaft.

The hollow shaft 1, forming the common member of each transmission element, is formed at its middle portion with a smooth cylindrical surface for the reception of the intermediate sheave 3, this annular surface $3^a$ having the largest external diameter of any portion of the shaft 1, the remaining exterior portion of the shaft being reduced or stepped down at intervals to form annular pulley engaging surfaces $2^a$ of relatively decreasing diameters toward the outer end of the shaft 1, said annular pulley engaging faces being threaded to have threaded engagement with the interior of the pulley members or sheaves 2.

The middle sheave 3 is held against axial displacement by opposite thrust or clamping rings 4 which have threaded engagement with the screw threads on the adjacent threaded portion of the portion $2^a$ of the hollow shaft 1 which supports the next adjacent sheave 2.

As best illustrated in Fig. 7, each reduced annular threaded portion $2^a$ and $2^b$ for supporting and adjusting the successive pulley sheaves are threaded, but in order to secure an equal spacing between the middle pulley, the next adjacent one and the outer one, the pitch of the screw thread $2^b$ and of its corresponding pulley is double the pitch of the screw thread $2^a$. As the middle pulley 3 is not movable laterally or axially, it will be obvious that if the next pulley be rotated on its screw thread sufficiently to increase its distance from the middle pulley, say one-half inch, then to effect an equal spacing between the two outermost pulleys, the outermost pulley must be adjusted outward by a lateral or axial movement equal to twice that distance, since if it travels only as far in an axial direction as does the adjacent inner pulley, the spacing between these two pulleys will not be increased at all. It will therefore be seen that no matter how many pulleys may be used in the series, each one toward the outside must travel axially, not only the same distance that the next inner pulley travels, but must also travel a further distance equal to the increment of spacing desired between all the pulleys.

Of course, the same pitch might be used for all the exterior threads and for the interior threads on each pulley, but in that case the successive pulleys, proceeding from the middle pulley outward, would necessarily require increasing arcs of rotation giving an opportunity for errors in adjustment.

According to the present invention, however, the middle pulleys 3 is held in any desired position of adjustment on its carrier shaft 1 by means of a radial set-screw 6. This pulley is also provided at its untapered inner portion with a series of transverse apertures 3$^b$ arranged at equal radial distances around the central axis in order to receive a transverse locking pin or key 7 which may be passed through any of these apertures and through corresponding apertures in the other pulley elements or sheaves 2 when they are brought into registry with the aperture in the middle pulley 3. The outer portions of the lateral faces of all the pulleys are tapered so that the opposed adjacent faces of two pulleys converge toward the center or axis of the element and, because of this construction it results that the farther apart the pulley faces are spaced the farther inward the engaging belts 8 will move toward the center and, conversely, the nearer the pulley sheaves are brought together the farther from the center axis will be the loci of belt engagement with the tapered faces of the respective pulley sheaves.

As each connecting belt 8 has a wedge-like engagement with the tapered annular faces of the pulley sheaves between which it is interposed, it will be found that the belt has a very powerful grip practically free from slip, while the area of contact or engagement between the belts and the sheaves may be actually larger than if the belt engaging surfaces were cylindrical, so that for both reasons the capacity for transmitting power is very largely increased, while at the same time an indefinite number of speed ratios within the speed variation limits of the device are made possible, since each very slight circumferential adjustment of the middle or anchoring pulley 3 serves to effect a corresponding variation in the ratio of speed transmission inasmuch as a corresponding adjustment in the opposite direction will be made on the other transmission element. The capacity for speed variation will depend upon the ratio of inward and outward adjustment to the diameter of the transmission element employed.

While a speed change transmission employing a pair of single bevel surfaced sheaves having one laterally adjustable side has been heretofore proposed, nevertheless such a device could be used only for very light transmission, because only a narrow belt could be efficiently used for power since the use of a wide belt would cause such belt, supported only at its side edges, to buckle or collapse along the middle with consequent loss of traction instead of increased traction. The present invention makes it practicable to increase the power transmission to any desired extent since provision is made for uniformly positioning all the belts on all the beveled sheaves of each element at precisely the same radial distance from the central axis, and this, too, by merely rotating the interlocked sheaves of the element simultaneously about the carrier shaft after slackening the set-screw in the anchoring sheave.

What I claim is:

1. A speed change transmission embracing a pair of rotatable belt connected pulley elements, each comprising a series of axially spaced beveled sheaves secured upon a coaxial shaft by means permitting equal variation in the spacing of the sheaves through rotative adjustment of the sheaves about the shaft, and a series of transversely tapered belts interposed between corresponding sheaves of the respective pulley elements and having engagement with the beveled faces of such sheaves at different distances from the respective shafts dependent upon the spaced adjustment of the sheaves.

2. A multiple belt speed change pulley element comprising a shaft, a sheave secured thereto to have rotative adjustment thereon without axial movement, an axially adjustable sheave interconnected with said first named sheave to be rotated therewith to different position circumferentially of the shaft, the second sheave having engagement with the shaft to effect its axial adjustment by means of such rotative movement.

3. A speed change pulley element embracing a shaft, an anchoring sheave secured to said shaft by fastening means permitting circumferential adjustment thereon, a plurality of axially adjustable beveled sheaves interconnected with said anchoring sheave to be rotated therewith for circumferential adjustment said axially adjustable sheaves having threaded engagement with said shaft by which the spacing of the sheaves from each other is widened or narrowed by equal increments or decrements when said thread engaged sheaves are rotatively adjusted upon the shaft.

4. A speed change pulley element embracing a shaft, a series of axially adjustable spaced beveled sheaves mounted thereon, means for securing said sheaves to said shaft to permit their rotative adjustment thereon, each successive axially adjustable sheave having threaded connection with the shaft by threads of successively increased pitch whereby such sheaves by equal rotative adjustment about the shaft are caused to move apart by equal spacing increments to allow interposed tapered belts to be positioned nearer the central axis but at equal distances therefrom.

5. A speed change pulley element embracing a central shaft having a succession of externally threaded portions of progressively smaller diameters, the progressively smaller portions having threads of progressively increased pitch, a series of correspondingly threaded beveled sheaves secured to the respective threaded portions to have progressively increased axial adjustment through circumferential adjustment about said shaft and means for securing the sheaves in the shaft in their respective positions of circumferential adjustment.

6. A speed change pulley element embracing an annularly stepped shaft whose successive annular steps are formed with threads of successively increased pitch, a series of correspondingly threaded beveled sheaves secured to said shaft about the respective steps, means interconnecting said sheaves to secure equal rotative adjustment about the shaft and means for securing said sheaves in any desired position of rotative adjustment upon said shaft.

7. A speed change pulley element embracing a shaft, an anchoring sheave secured to said shaft against axial movement while permitted rotative adjustment thereon, spaced lateral sheaves arranged on opposite sides of said anchoring sheave, the lateral sheaves having threaded connection with the shafts, each successive sheave from the anchoring sheave having its threaded connection of increased pitch to cause increased axial displacement of each successive sheave as the sheaves are rotatively adjusted upon the shaft, the sheaves having annular beveled belt engaging surfaces whose spacing apart determines the radial distance of the sheave contacting portions of the belts, and means by which uniform rotative adjustment of all the sheaves is assured.

8. A multiple speed change pulley embracing in its construction a shaft, a middle sheave secured thereto by means permitting circumferential adjustment without axial movement, lateral sheaves on each side of said middle sheave adjustable to and from the middle sheave by means of rotative adjustment therewith about the shaft while preserving equal spaced relations between all adjacent sheaves, each sheave having its periphery bevelled on opposite sides to present an annular wedge-shaped belt engaging peripheral rim portion.

9. A multiple speed change pulley for a multiple belt transmission embracing in its construction a shaft, a middle oppositely bevelled sheave secured thereto by means permitting circumferential adjustment without axial displacement, symmetrically arranged pairs of lateral sheaves, the sheaves of each pair being mounted on opposite sides of the middle sheave and at equal distances therefrom, each pair of lateral sheaves being adjustable by rotative movement to positions nearer to or further from the middle sheave, the outer pairs of sheaves being given an increased axial displacement when rotated through the same circumferential arc of adjustment to preserve uniform spacing between all the sheaves of the series.

10. A multiple speed change pulley for a multiple belt transmission embracing in its construction a plurality of side by side belt engaging sheave members embracing an interior shaft, said sheaves having wedge-shaped peripheral portions and having engagement with said shaft whereby simultaneous rotation of the sheaves in relation to the shaft acts to vary the distances separating each sheave from its adjacent sheave, means interlocking said sheaves together to cause uniform rotation thereof to effect lateral adjustment, and means for locking said sheaves in any desired position circumferentially of the shaft.

In witness whereof, I have subscribed the above specification.

EDGAR F. HATHAWAY.